United States Patent [19]

Fawley

[11] Patent Number: 4,559,974
[45] Date of Patent: Dec. 24, 1985

[54] APPARATUS AND METHOD OF ARRESTING DUCTILE FRACTURE PROPAGATION

[76] Inventor: Norman C. Fawley, 255 Rafael Walk, Long Beach, Calif. 90803

[21] Appl. No.: 633,684

[22] Filed: Jul. 25, 1984

Related U.S. Application Data

[63] Continuation of Ser. No. 432,321, Oct. 1, 1982, abandoned.

[51] Int. Cl.⁴ ............................................. F16L 9/14
[52] U.S. Cl. ................................... 138/172; 138/178; 138/DIG. 2
[58] Field of Search .............. 138/99, 103, 109, 110, 138/141, 144, 145, 155, 172, 174, 178, DIG. 2; 156/171, 172, 173, 175, 180; 220/3, 71, 72, 414, DIG. 23; 242/2; 285/286

[56] References Cited

U.S. PATENT DOCUMENTS

| | | | |
|---|---|---|---|
| 2,026,133 | 12/1935 | Mapes | 220/3 |
| 2,280,501 | 4/1942 | Stephenson | 220/3 |
| 2,401,092 | 5/1946 | Miller et al. | 138/109 |
| 2,718,583 | 9/1955 | Noland et al. | 219/312 |
| 2,824,033 | 2/1958 | Donaldson | 154/74 |
| 2,857,932 | 10/1958 | Calderwood | 138/141 |
| 2,924,546 | 2/1960 | Shaw | 138/99 X |
| 3,096,105 | 7/1963 | Risley . | |
| 3,184,092 | 5/1965 | George | 220/3 |
| 3,240,644 | 3/1966 | Wolff | 156/165 |
| 3,307,730 | 3/1967 | Davidson | 220/3 |
| 3,349,807 | 10/1967 | Penman | 138/172 |
| 3,439,405 | 4/1969 | Berman et al. | 29/407 |
| 3,457,963 | 7/1969 | Hardwick | 138/172 |
| 3,480,499 | 11/1969 | Paul | 156/175 |
| 3,483,896 | 12/1969 | Grosh | 138/141 |
| 3,486,655 | 12/1969 | Ragettli | 220/3 |
| 3,502,529 | 3/1970 | Borgnolo et al. | 156/172 |
| 3,631,897 | 1/1972 | Fischer et al. | 138/141 |
| 3,698,746 | 10/1972 | Loncaric | 285/286 |
| 3,757,829 | 9/1973 | Berry et al. | 138/144 X |
| 3,768,269 | 10/1973 | Broussard et al. | 405/168 |
| 3,815,773 | 6/1974 | Duvall et al. | 220/3 |
| 3,843,010 | 10/1974 | Morse et al. | 220/3 |
| 3,860,039 | 1/1975 | Ells | 138/103 |
| 3,860,043 | 1/1975 | Kutnyak et al. | 138/153 |
| 3,870,350 | 3/1975 | Loncaric | 138/155 X |
| 3,873,139 | 3/1975 | McCabe | 285/286 |
| 3,880,195 | 4/1975 | Goodrich et al. | 138/172 |
| 3,900,048 | 8/1975 | Isham et al. | 138/144 |
| 3,939,874 | 2/1976 | Gray | 138/145 |
| 3,969,812 | 7/1976 | Beck | 29/421 R |
| 3,977,614 | 8/1976 | Hardwick | 242/2 |
| 4,001,054 | 1/1977 | Makepeace | 138/155 X |
| 4,014,370 | 3/1977 | McNulty | 138/144 |
| 4,106,528 | 8/1978 | Laing | 138/149 |
| 4,144,125 | 3/1979 | Maritsch | 138/172 X |
| 4,148,127 | 4/1979 | Somerville | 138/172 X |
| 4,176,691 | 12/1979 | Jude et al. | 138/103 |
| 4,180,104 | 12/1979 | Park et al. | 285/286 X |
| 4,195,669 | 4/1980 | Ives et al. | 138/172 X |
| 4,214,932 | 7/1980 | Van Auken | 156/187 |
| 4,224,966 | 9/1980 | Somerville | 138/172 |
| 4,289,172 | 9/1981 | Ekstrom | 138/149 |
| 4,383,556 | 5/1983 | Evgenievich et al. | 138/155 |
| 4,391,301 | 7/1983 | Pflederer | 138/103 |

FOREIGN PATENT DOCUMENTS

| | | | |
|---|---|---|---|
| 52-38630 | 3/1977 | Japan . | |
| 55-39444 | 10/1980 | Japan . | |
| 1532651 | 11/1978 | United Kingdom | 138/172 |

OTHER PUBLICATIONS

Levy, *Glass Reinforced Plastic Pipe*, Esso Research and Engineering Co., Linden, N.J., Apr. '61.
"Fracture Resistance of Wire-Wrapped Cylinders", Shoemaker et al., Journal of Engineering for Industry, Feb. '73, p. 219.

*Primary Examiner*—Stephen Marcus
*Assistant Examiner*—Mark Thronson
*Attorney, Agent, or Firm*—Marvin A. Naigur; John E. Wilson; John P. Shannon, Jr.

[57] ABSTRACT

A crack arrester for stopping a propagating ductile fracture in an object such as a pipe comprises a band defined by a plurality of continuous, high tensile strength, nonmetallic fibers which are wound around the object in intersecting relationship with the direction of propagation and are encapsulated in a resin matrix which is cured.

34 Claims, 11 Drawing Figures

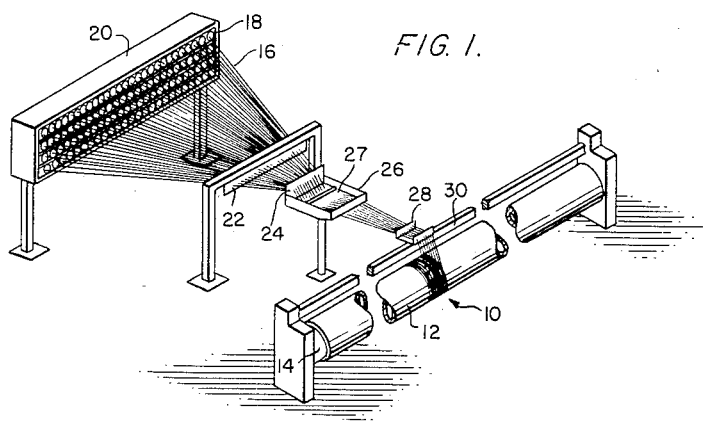
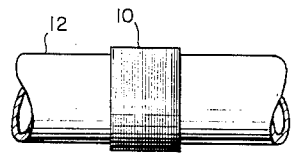
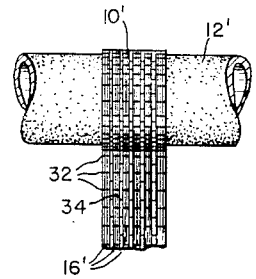
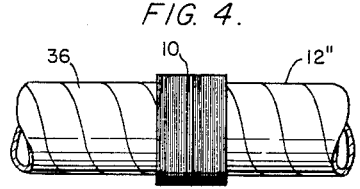
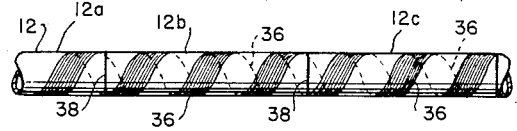
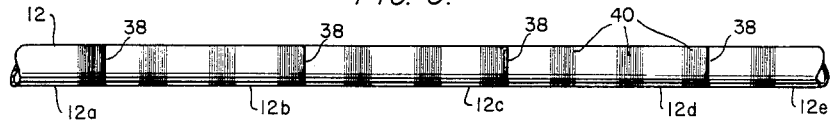
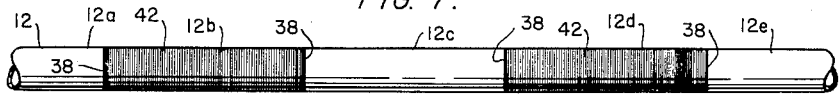

APPARATUS AND METHOD OF ARRESTING DUCTILE FRACTURE PROPAGATION

This application is a continuation of application Ser. No. 432,321, filed Oct. 1, 1982, now abandoned.

BACKGROUND OF THE INVENTION

Objects of metal and other materials which are subjected to high stresses tend to fail by developing one or more propagating ductile fractures, which are commonly called free-running cracks. The range of objects which exhibit such propagating ductile fractures is too large for all of the objects to be mentioned specifically in this application, but it includes compressed gas cylinders, pipes and so on. One of the areas which presently appears to be facing the greatest potential problems due to propagating ductile fractures is that of pipes, and especially the relatively large diameter pipes which are used in pipelines.

Pipelines of a relatively large diameter that are formed by pipes of steel or other metal are playing increasingly important roles in the transportation of gases, such as natural gas, $CO_2$, and other volatile fluids. For example, with the increase in domestic gas reserves and a corresponding increase in the use of natural gas, there will be a corresponding increase in the need for pipelines for transporting the gas at gathering pipelines and through long-range transmission lines.

Especially if flawed or damaged, and if they contain fluid at relatively high pressures, these types of pipes are susceptible to a propagating ductile fracture, or free-running crack, that will travel at velocities of 400–1200 feet per second. The probability of this type of fracture initiating is increased if the product in the pipeline is corrosive, either because of the gas itself or because of moisture, which is often contained in the gas. The probability is also increased in the case of steel pipes carrying natural gas containing large quantities of hydrogen sulfide, which has been known to create hydrogen embrittlement. Furthermore, any moisture in the gas and any $CO_2$ which may be present will generate carbonic acid, which can also damage steel pipes. In addition, the problem of failure is significantly compounded in a cold climate. Moreover, a propagating ductile fracture or free-running crack can be caused by impact from an external force such as a trenching machine accidentally striking the pipeline, earthquakes, frost heave and the like.

The tendency for objects to fail by a propagating ductile fracture is generally due to the nature of the material of which the object is made and the manner in which the material is worked or shaped to form the object. For example, many pipes for pipelines are long-seam welded pipes made from a metal block which is elongated more in one direction than in another by being passed between pairs of rollers or similar means. Such a method produces an elongated plate which is then formed into a "U" configuration by bending it about its longitudinal axis. The U-shaped plate is further bent into a cylindrical configuration by bringing the sides of the "U" into abutment in an "O" and joining the sides along the length thereof, such as by welding, to form a substantially straight longitudinal seam. In such a pipe, there is considerably greater strength in the longitudinal direction than there is in the circumferential or hoop direction, which defines an axis of inherent weakness, and, as a result, the pipe is able to withstand greater stress in the longitudinal direction than in the hoop direction. Therefore, when such a pipe fails, it is the result of a hoop of indeterminate width being broken and the ends of the broken hoop being separated. Then, adjacent hoops are broken as the result of the failure of the first hoop, and a line of separating hoop ends moves longitudinally along the pipe to define a propagating ductile fracture.

In addition to the long-seam welded pipes just mentioned, ductile fractures have also been known to propagate in a direction parallel to the axis of the pipe in spiral-welded pipes, which are formed by coiling a sheet of steel into a spiral and welding the adjacent edges of the sheet.

Although there have been numerous proposals to limit ductile fracture propagation in objects and especially in pipelines, including the use of heavy walled pipes, cables, concrete abutments, valves and metal sleeves, they have all been less than completely satisfactory.

For example, U.S. Pat. No. 4,195,669 to Ives et al discloses arresting ductile fracture propagation by providing an encircling mass of material around the pipe at preselected intervals as a circumferential restraint. However, the steel collar, the steel cable windings and the reinforced concrete cast disclosed by Ives et al are all quite heavy and difficult to handle and install. In addition, the crevice between the encircling masses and the pipe, and the crevices between adjacent windings in the case of steel cables, are subject to the ingress of dirt and moisture and the resultant crevice corrosion, which weakens the pipes. Moreover, the corrosion attacks the encircling masses themselves, especially in the case of cables. Furthermore, in metals having higher tensile strengths, the effects of corrosion are accelerated.

U.S. Pat. Nos. 4,148,127 and 4,224,966 to Somerville disclose a method of applying a band-type crack arrestor over the outer diameter of a pipe and applying radial force to the inner diameter of the pipe to engage the arrestor in a tight fit. The disclosed crack arrestors are preferably bands or rings of the same metal as the pipeline. Therefore, they suffer from the same great weight and crevice corrosion problems as the encircling masses of the Ives et al patent. In addition, the tight fit of the pipe with the edges of the crank arrestors tends to damage any underlying corrosion protection layers and to cause stress concentrations in the pipe where the crack arrestor edges engage it. Of course, stress concentrations can lead to premature failure of the pipe. The Somerville patents also disclose that the bands can be fiberglass, but state nothing more about fiberglass bands. If the band is a typical molded ring of randomly oriented glass fibers, the thickness required to stop a crack would be such as to make the band very bulky and unwieldy.

U.S. Pat. No. 3,870,350 to Loncaric discloses a pipe having zones of increased crack resistance due to cylindrical steel members surrounding the pipe, to which they are at least partially welded. The steel members are heavy and, thus, difficult to handle and install, as well as being subject to crevice corrosion.

Besides the need for crack arrestors, corrosion protection is desirable for pipes and other objects, even where no crack arrestors are involved, but to provide corrosion protection for a pipe in the region of a crack arrestor and to apply it in a manner which is compatable with the presence of crack arrestors presents additional problems.

SUMMARY OF THE INVENTION

It is therefore an object of the present invention to provide an improved apparatus and method for arresting a propagating ductile fracture in an object, such as a pipe.

It is a further object of the present invention to provide an apparatus and method of the above type in which the arrest of propogating ductile fracture is assured with a minimum of added labor and materials, and at a reasonably low cost.

It is another object of the present invention to provide an apparatus and method of the above type which is lightweight, corrosion-resistant and capable of protecting the object from impacts in the region of application.

It is a still further object of the present invention to provide an apparatus and method of the above type which incorporates the provision of corrosion protection for the object in the region of application.

Toward the fulfillment of these and other objects, a plurality of crack arrestors are placed around the object, encompassing and engaging the object at spaced intervals, each crack arrestor defined by a band of continuous, substantially unidirectional, lightweight, high-strength nonmetallic fibers encapsulated in a resinous material, the band having a thickness sufficient to arrest a propagating ductile fracture in the object under the conditions present.

Some nonmetallic fibers have very high tensile strengths, while being lightweight, corrosion-resistant and very inexpensive. Glass fibers, for example, have a tensile strength which is approximately four times the strength of steel. As a result, continuous glass fibers which are aligned in one direction, such as in a roving of a plurality of parallel flexible glass strands, have tremendous strength in the direction parallel to their length. Therefore, a plurality of continuous, substantially unidirectional glass fibers in a plurality of parallel rovings wrapped around an object which tends to develop propagating ductile fractures or free-running cracks, in a direction intersecting and, substantially perpendicular to the cracks and the longitudinal axis of the pipe, substantially equalizes the hoop strength of the object with its longitudinal strength and greatly increases the stress that the object can endure without failing. Furthermore, glass fibers wrapped around an object in a band in the circumferential or hoop direction can stop a failure, in the form of a ductile free-running crack, after it has begun.

The thickness of the band depends on a number of factors, such as the strength of the pipe, the wall thickness of the pipe, the operating pressure, the desired width of the band, etc. Thus, for example as the pressure of the fluid carried in the pipe increases, a band of greater thickness or greater width is required to arrest a crack. Furthermore, as the width of the band is decreased, its thickness must be increased to arrest a crack, if all other conditions remain the same. The bands according to the present invention are about one-half the thickness and about one-fourth the weight of conventional steel crack arrestors for the same application. However, despite the light weight, they have all the strength of the steel crack arrestors, unlike conventional wrappings of fiber cloth or mats, even those composed of glass fibers, which merely serve as vehicles to carry a corrosion resistant material and which have insufficient glass fiber to add any reinforcing strength to a pipe or to arrest a propagating crack. Conventional mats made of glass fibers are typically on the order of 0.015 of an inch thick per layer, the glass fibers are randomly oriented and the total thickness of a mat wrapping is typically in the range of 0.045–0.060 of an inch. A crack arrestor according to the present invention for use on the same pipe as the glass mats just described would be significantly thicker and would contain many times more glass which is oriented in a direction effective for arresting a propagating ductile fracture.

Bands of such continuous, substantially unidirectional glass fibers are well suited for application to pipes as crack arrestors, and can be wrapped at selected positions on pipe sections in the shop or can be wrapped around pipe already installed at a job site. The glass fibers can also be applied where there is concern for stress concentrations, such as at pipe joints and at corners or elbows. Moreover, such bands can be wrapped either by machine or by hand.

In the crack arrestors, the continuous, substantially unidirectional glass fibers are encapsulated in a matrix of resinous material which is later cured, such as asphalt enamel, coal tar enamel, polyester, or epoxy. The glass fibers are lightweight and not subject to corrosion and, once they are encased in the cured resin matrix, the resultant crack arrestor is immune to the corrosion and other environmental problems which plague the crack arresting devices of the prior art. In addition, the crack arrestor according to the present invention forms a bond with the object, providing corrosion protection for the pipe, eliminating the ingress of dirt and moisture, and preventing any crevice corrosion. Moreover, the crack arrestor is resilient and energy-absorbent, thereby protecting the pipe from external impacts and avoiding the induction of stress concentrations in the pipe.

The crack arrestors according to the present invention can be wrapped on bare pipe; they can be wrapped on pipe completely coated with a corrosion-resistant substance; and they can be wrapped on pipe having a wrap laden with a corrosion-resistant substance. The glass fibers of the crack arrestors can be saturated with the resinous material by being passed through a resin bath as they are wrapped on the pipe, or the fibers can be saturated with the resinous materials by coating rollers or spray heads after they are in place on the pipe. As another alternative, the fibers can be previously impregnated with the resin (pre-preg), wrapped on the pipe while dry, and then heated to allow the resin to flow and cure. The glass fibers can be drawn from a plurality of spools and aligned in parallel as they are wound on the pipe, or they can be pre-aligned and held together by cross filaments to form mats which are wound around the pipe.

When the band of glass fibers in a resinous matrix is wound around the pipe to the appropriate thickness, the matrix is cured to form a hardened, fluid impervious, corrosion resistant, energy absorbing, lightweight mass. The curing is accomplished by such suitable means as the application of heat, ultraviolet radiation, or catalyst. Where the pipe is previously treated in a process which requires the application of heat, as in the case of coating the pipe with fusion bond epoxy for corrosion resistance, the glass fibers and the resinous matrix can be applied immediately after the aforementioned process, and the residual heat from the process can be utilized to cure the resinous matrix, thereby eliminating the need for any additional step to cure the matrix.

The present invention also contemplates forming the crack arrestor separate from the pipe by wrapping a band of glass fibers in a resin matrix on a mandrel, curing it, removing it from the mandrel, and then slipping it over the pipe when and where it is convenient. The crack arrestors of the present invention are very lightweight, approximately one-fourth the weight of a steel crack arrestor for the same diameter pipe. No special means of securing the crack arrestor to the pipe is required. All that is needed is some means of preventing the crack arrestor from moving along the pipe, such as filling the space between the crack arrestor and the pipe with a mastic material, such as a foam plastic, which eliminates the possibility of crevice corrosion.

Due to the strength of the glass fibers and the ability of the resin to absorb energy, the crack arrestors protect from external impacts the portions of the pipe which they cover and also prevent or reduce fragmentation of the pipe in the area of the crack arrestor upon failure of the pipe.

BRIEF DESCRIPTION OF THE DRAWINGS

The above brief description, as well as further objects, features and advantages of the present invention will be more fully appreciated by reference to the following detailed description of a presently preferred but nonetheless illustrative embodiment in accordance with the present invention, when taken in conjunction with the accompanying drawings wherein:

FIG. 1 is a perspective view of a crack arrestor according to the present invention being wound around a pipe;

FIG. 2 is an elevation of the crack arrestor of FIG. 1 in place on a bare pipe;

FIG. 3 is an elevation of an alternate form of the crack arrestor being wound around a coated pipe;

FIG. 4 is an elevation of the crack arrestor of FIG. 1 in place on a pipe wrapped for corrosion resistance;

FIG. 5 is an elevation of another embodiment of the crack arrestor according to the present invention;

FIG. 6 is an elevation of still another embodiment of the crack arrestor according to the present invention;

FIG. 7 is an elevation of yet another embodiment of the crack arrestor according to the present invention;

DETAILED DESCRIPTION OF THE PREFERRED EMBODIMENT

Figure 8:
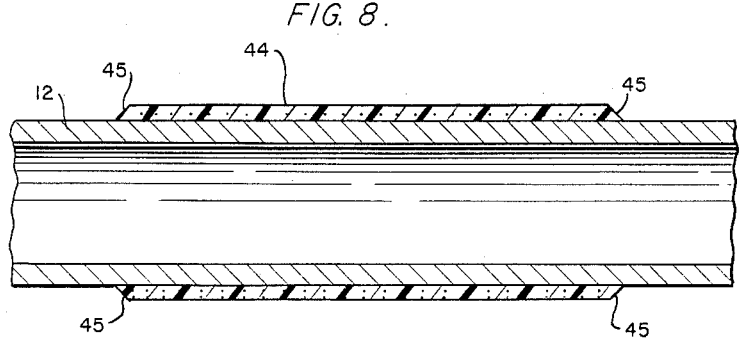
FIG. 8 is a cross section of a further embodiment of the crack arrestor according to the present invention.

As can best be seen from FIG. 1, the crack arrestor according to the present invention, which is generally designated by the reference numeral 10, is wound around an object, such as a bare pipe 12, which is mounted on a rotating mandrel 14. Although a pipe is illustrated in FIG. 1, it is understood that the crack arrestor can similarly be wound around a compressed gas cylinder or other object which might develop propagating ductile fractures, or free-running cracks.

The crack arrestor comprises a band made up of a plurality of rovings 16, each of which includes a large number of continuous, substantially unidirectional, lightweight, high-strength, inorganic, nonconductive, nonmetallic fibers such as glass fibers, which are wound around the object in substantially perpendicular, intersecting relationship with the direction in which the ductile fractures tend to propagate. Although glass fibers will be referred to throughout the specification, similar fibers having a high tensile strength, such as Kevlar, an aramid fiber, may also be used. The rovings 16 are drawn from a plurality of spools 18 contained in a creel 20 and are fed through gathering and aligning devices 22 and 24 prior to being drawn through a bath 26 containing a resin 27 such as epoxy, asphalt enamel, coal tar enamel or polyester, in which they are saturated with the resin. The rovings 16 continue on from the bath 26 to a roving applicator 28 which is mounted for movement on a bar 30 arranged parallel to the rotating mandrel 14, and some device is usually provided for removing excess resin. The roving applicator 28 can be moved back and forth along the bar 30 between predetermined limits to wind on the pipe 12 a band having the desired width. Moreover, additional layers of the continuous, resin-encapsulated fibers can be wound onto the pipe 12 until a band or crack arrestor 10 having the appropriate thickness is achieved.

The apparatus shown for winding the crack arrestor 10 on the pipe 12 is merely exemplary, it being understood that the glass fibers contained in the rovings 16 can be wound on the pipe 12 without the resin, and the resin 27 can be applied to the glass fiber windings on the pipe 12 by coating rollers, spray nozzles or other suitable devices. However, applying the resin 27 to the rovings 16 prior to the winding of the rovings 16 on an object has the advantage that the tackiness of the resin 27 causes the rovings 16 to adhere to the object, thereby aiding in the starting of the windings. In any of the methods described, sufficient resin is applied so that the crack arrestor 10 comprises continuous, unidirectional glass fibers encapsulated in a matrix of the resin 27, and so that it forms a continuous bond with the object, leaving no space for the ingress of dirt or moisture which is apt to cause corrosion.

Besides the pipe 12 on the rotating mandrel 14 shown in FIG. 1, the crack arrestors 10 can be applied to stationary objects by other machines, and the crack arrestors can be applied to either rotating or stationary objects by hand. Some of the machinery is suitable for applying the crack arrestors 10 in the field as well as in the shop. When the crack arrestors 10 are in place, the resin 27 is cured by the application of heat, ultraviolet radiation, catalysts or other suitable means to form a hardened, fluid impervious, corrosion resistant, energy absorbing, lightweight mass.

The glass fibers can be previously impregnated with the resin 27 and applied to the pipe 12 in a dry state. Once the pre-impregnated glass fibers are in place, the application of heat to the fibers causes the resin 27 to run, thereby forming a single mass of glass fibers encapsulated in a resin matrix. The further application of heat will cure the resin, as will any of the other curing processes previously described.

Preparatory to treating a pipe according to the method of the present invention, the pipe is preferably cleaned by either sand or grit blasting or by mechanical scraping and wire brushing to render the pipe surface free from oil, grease, dust, moisture and non-adhering mill scale. As is illustrated in FIG. 2, the crack arrestor 10 is shown in place, bonded to the bare pipe 12. Although the pipe 12 in FIG. 2 is bare, the crack arrestor 10 can also be applied to coated pipe such as pipe have a coating for corrosion resistance. For example, a hot, relatively viscous substance, such as coal tar enamel, or an asphalt enamel can be applied to the primed outer surface of the pipe, as disclosed in detail in Applicant's copending application, Ser. No. 312,958, filed Oct. 20, 1981. Alternatively, the pipe can be precoated with a fluidized epoxy powder which is sprayed onto the preheated outer pipe surface, by an electrostatic process, or the like. Still further, a coating of extruded polyethylene can be extruded onto the outer pipe surface in a conventional manner.

As is illustrated in FIG. 3, a crack arrestor 10' is partially wound around a coated pipe 12', the continuous glass fibers in the crack arrestor 10' being contained in rovings 16' held together by cross filaments 32 to define a mat 34. The mat 34 is saturated with resin 27 and wound around the pipe 12' to form another embodiment of crack arrestor 10' according to the present invention. Mats of other configurations can also be employed.

Where a crack arrestor according to the present invention is applied to a coated pipe, as in the case illustrated in FIG. 3 in which the crack arrestor 10' is wound around the coated pipe 12', the coating process involves the heating of the pipe. In such a case, the wrapping of the crack arrestor 12' can be done immediately after the coating so that the residual heat from the coating process cures the resin matrix of the crack arrestor, thereby eliminating the need of a separate step for curing the resin matrix.

As is illustrated in FIG. 4, the crack arrestor 10 can be wound around pipe 12'' already having a wrapping, such as a helical wrapping of paper, fabric, a mat of randomly oriented glass fibers (having insignificant strength) or other material treated with asphalt or other anti-corrosion substance to provide corrosion protection for the pipe 12''. The wrapping can also be an adhesive coated tape of polyethylene or polypropylene. The crack arrestor 10 of FIGS. 1 and 2 is shown in place over the wrapping 36, but the crack arrestor 10' of FIG. 3, defined by the resin saturated mat 34, can also be used over the wrapping 36, as can other forms of the crack arrestor according to the present invention hereinafter to be described.

The crack arrestors are ordinarily wound to a width and thickness which will stop the propagation of a crack, and are placed at predetermined intervals along a pipeline. For example, one crack arrestor 10 can be provided for each section of pipe in the pipeline. It has been found that, in most instances, a crack arrestor according to the present invention, having a width less than the diameter of the pipe and a thickness less than the thickness of the pipe is sufficient, by itself to stop a propagating fracture. A band having a width equal to approximately two-thirds of the diameter of the pipe and having a thickness equal to approximately 60% of the thickness of the pipe has successfully stopped a crack.

Crack arrestors can also be applied such that a band of glass fibers in a resin matrix is insufficient to stop the crack by itself, but a series of bands are provided so that, acting together, they decelerate and stop the propagation of the crack. For example, as is shown in FIG. 5, a continuous helical band 36 of glass fibers in a resin matrix can be applied in a helix along the entire length of the pipe 12, being wound right across joints 38, usually in the form of welds, between pipe sections 12a, 12b and 12c. The helix has a pitch such that there is a space between adjacent revolutions of the helix. As an alternative, a plurality of closely spaced band sections or mini-bands 40 can be applied along the pipe 12 to decelerate and stop the propagation of a crack, as is illustrated in FIG. 6.

In another arrangement, alternate or periodic sections of the pipe 12, such as pipe sections 12b and 12d, can be wrapped with continuous glass fibers in a resin matrix to define a crack arrestor 42 extending the entire length of the pipe section, as is shown in FIG. 7. Of course, with this arrangement, one crack arrestor 42 is sufficient to arrest a crack, and only half of the pipe sections or fewer need any crack arrest treatment.

Figure 9:
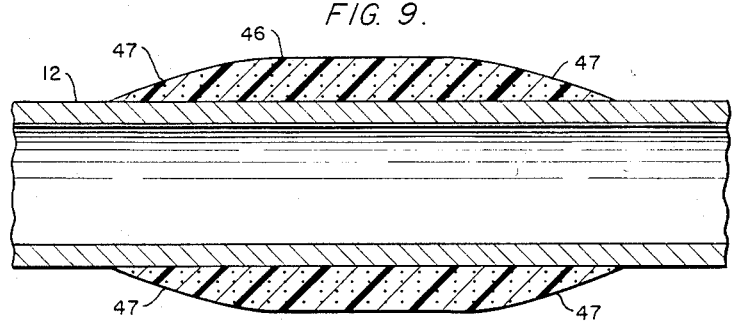
FIG. 9 is a cross section of a still further embodiment of the crack arrestor according to the present invention.

Ordinarily, the windings of a crack arrestor according to the invention have rectangular cross-sectional configurations, although configurations other than rectangular can be used. As is shown in FIG. 8, the lateral edges 45 of the crack arrestor 44 are bevelled. As is shown in FIG. 9, the cross section of the crack arrestor 46 has an arcuate section such that the crack arrestor 46 is thickest at its center and is tapered at its edges 47. The cross sections of the crack arrestors 44 and 46 of FIGS. 8 and 9, respectively, are stippled to represent the cross sections of the glass fibers. Although only a few dots are shown, they represent hundreds of thousands of fibers in parallel, unidirectional relationship which are present in all of the embodiments of the present invention, each fiber preferably having a diameter less than 0.001 inch. The fibers comprise approximately 67%–75% of the crack arrestors of the present invention, with the resin matrix comprising the remainder of each crack arrestor. The crack arrestors according to the present invention are wound essentially without tension, only sufficient tension being applied to permit the glass fibers to be wound neatly and orderly. As a result, the crack arrestors do not damage any underlying corrosion protection layers and do not transmit significant stress to the pipes they wrap. Thus, they do not tend to produce stress concentrations in the pipes, especially along the edges of the crack arrestor. However, both of the embodiments of FIGS. 8 and 9 further reduce the stress between the crack arrestor and the pipe 12 along the edges of the crack arrestor, thereby eliminating any possibility of the crack arrestor damaging underlying layers or causing stress concentrations in the pipe 12 at those places.

Figure 10:
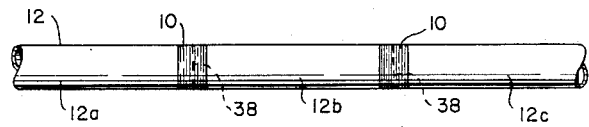
FIG. 10 is yet a further embodiment of the crack arrestor according to the present invention.

Since the crack arrestors according to the present invention can be wrapped onto the pipe in the field, they can be placed directly over the joints 38 in the pipe 12, between the pipe sections 12a, 12b and 12c, as shown by the crack arrestors 10 in FIG. 10, thereby providing crack arrest capabilities and at the same time protecting the joints 38, which must be protected and which heretofore required some separate form of protection. Although FIG. 10 shows the crack arrestor 10 of FIGS. 1 and 2 in place over the joints 38, the other embodiments of the crack arrestor according to the present invention, such as the crack arrestor 10' of FIG. 3 employing the mat 34, could be placed over the joints 38.

Figure 11:
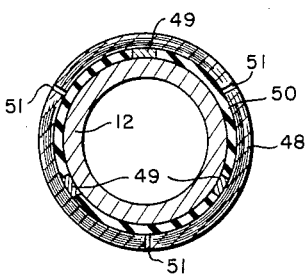
FIG. 11 is a transverse cross section of a pipe having mounted thereon another, separately formed embodiment of the crack arrestor according to the present invention.

FIG. 11 is a transverse cross section of the pipe 12 having mounted thereon a separable crack arrestor 48, which is formed of the same materials as the other embodiments of the crack arrestor described herein, but which is formed of the crack arrestor described herein, but which is formed separate from the object to be treated, as by being wound onto a rotating mandrel, cured and removed. Since the glass fibers and the resin are very lightweight, a crack arrestor for a pipe several feet in diameter is light enough to be moved by one man and to be handled far easier than a corresponding steel crack arrestor. The crack arrestor 48 is slipped over the pipe 12 and secured to the pipe to prevent it from sliding along the length of the pipe. One suitable mechanism for holding the separable crack arrestor 48 in place on the pipe 12 is the placement of a plurality of wedges 49, spaced at 90° or 120° intervals, between the edges of the crack arrestor 48 and the pipe 50, with their tapered ends pointed toward the axial center of the crack arrestor, and the provision of a filling 50 of mastic material, such as a plastic foam, such as urethane, in the space between the pipe 12 and the crack arrestor 48. The mastic material can be fed into the space from the sides of the crack arrestor, between the wedges 49, or through bores 51 drilled radially through the crack arrestor. The filling 50 not only bonds the crack arrestor 48 to the pipe 12, but also fills in the space and prevents the ingress of dirt and moisture, thereby preventing the possibility of crevice corrosion.

Although it is apparent from the foregoing that the present invention provides significant advantages in the arrest of propagating ductile fractures or running cracks, it is understood that various changes and modifications may be made without departing from the spirit and scope of the present invention as recited in the appended claims and their legal equivalents.

What is claimed is:

1. In a crack arrestor for arresting a propagating ductile fracture in a pipe containing fluid under a pressure sufficient to subject the pipe to the possibility of a ductile fracture propagating at a high speed in a predetermined direction, wherein the crack arrestor comprises means for stopping the propagating ductile fracture, and the stopping means includes a band for encompassing and constraining said pipe, the improvement comprising:

the band including a plurality of substantially unidirectional continuous, high tensile strength, non-corrodible, lightweight nonmetallic fibers encapsulated in a resin matrix, the fibers defining with the resin matrix a fluid impervious mass.

2. The crack arrestor of claim 1 wherein the fibers are glass fibers.

3. The crack arrestor of claim 2, wherein the fibers are under only sufficient tension to have allowed the fibers to be wound orderly into the band.

4. The crack arrestor of claim 2, wherein each fiber has a diameter less than 0.001 inch.

5. The crack arrestor of claim 2, wherein the fibers comprise 76%-75% of the band.

6. The crack arrestor of claim 1 wherein the resin is an epoxy.

7. The crack arrestor of claim 1 wherein the resin is a polyester.

8. The crack arrestor of claim 1 wherein the band includes a plurality of layers of the fibers.

9. The crack arrestor of claim 1 wherein the fibers are held together by cross filaments to define a mat.

10. The crack arrestor of claim 1 wherein the band is a helix.

11. The crack arrestor of claim 1 wherein the band-section crack arrestor comprises a plurality of spaced band sections, each of which has a width and thickness insufficient to stop a propagating ductile fracture, but together having sufficient strength to decelerate and stop a propagating ductile fracture.

12. The crack arrestor of claim 1 wherein the band defines edges, the band being bevelled along its edges.

13. The crack arrestor of claim 1 wherein the band has edges and an arcuate cross section, the band being thickest at its center and tapered at its edges.

14. The crack arrestor of claim 1, wherein the band has a radially inner surface, and the crack arrestor further includes a layer of mastic material defining an annulus on the radially inner surface of the band.

15. The combination of a pipe, having an axis, for containing fluid under a pressure sufficient to subject the pipe to the possibility of a ductile fracture propagating at a high speed in a predetermined direction, and a crack arrestor for arresting such a propagating ductile fracture, wherein the crack arrestor comprises means for stopping the propagating ductile fracture, the stopping means includes a band encompassing and constraining said pipe, and the band includes a plurality of substantially unidirectional, continuous, high tensile strength, non-corrodible, lightweight nonmetallic fibers encapsulated in a resin matrix, the fibers defining with the resin matrix a fluid impervious mass.

16. The combination of claim 15 wherein the band is bonded to the pipe.

17. The combination of claim 15 wherein the fibers are oriented essentially perpendicular to the direction of propagation.

18. The combination of claim 15 wherein the width of the band is less than the diameter of the pipe.

19. The combination of claim 15 wherein the band and the pipe each include a wall, and the band wall and the pipe wall each have a thickness, the thickness of the band wall being less than the thickness of the pipe wall.

20. The combination of claim 15 wherein the pipe is coated, and the crack arrestor is positioned over the coating.

21. The combination of claim 15 wherein the pipe is wrapped, and the crack arrestor is positioned ever the wrapping.

22. The combination of claim 15 wherein the pipe includes a plurality of sections, each of said sections being defined by a discrete element, a said band being positioned on some of the sections along substantially the entire length of the section, while the other sections have no band.

23. The combination of claim 15 wherein the pipe includes a plurality of sections and joints between said sections, and a said band is positioned over each joint.

24. The combination of claim 15, wherein the fibers are glass fibers.

25. The combination of claim 24, wherein the fibers are under only sufficient tension to have allowed the fibers to be wound orderly into the band.

26. The combination of claim 15 wherein each fiber has a diameter less than 0.001 inch.

27. The combination of claim 24, wherein the fibers comprise 67%-75% of the band.

28. In a crack arrestor for arresting a propagating ductile fracture in a pipe containing fluid under a pressure sufficient to subject the pipe to the possibility of a ductile fracture propagating at a high speed in a predetermined direction, wherein the crack arrestor comprises means for stopping the propagating ductile fracture, and the stopping means includes a band for encompassing and constraining said pipe, the improvement comprising:

the band including a plurality of continuous, high tensile strength, non-corrodible, lightweight nonmetallic fibers encapsulated in a resin matrix, the fibers defining with the resin matrix a fluid impervious mass;

said fibers being oriented substantially perpendicular to said predetermined direction of propagation.

29. In a crack arrestor for arresting a propagating ductile fracture in a pipe containing fluid under a pressure sufficient to subject the pipe to the possibility of a ductile fracture propagating at a high speed in a predetermined direction, wherein the crack arrestor comprises means for stopping the propagating ductile fracture, and the stopping means includes a band for encompassing and constraining said pipe, the improvement comprising:

the band including a plurality of continuous, high tensile strength, non-corrodible, lightweight nonmetallic fibers encapsulated in a resin matrix, the fibers comprising at least 67% of the band and defining with the resin matrix a fluid impervious mass.

30. The crack arrestor of claim 29, wherein the fibers comprise no more than 75% of the band.

31. The crack arrestor of claim 29, wherein the fibers are glass fibers.

32. The combination of a pipe, having an axis, for containing fluid under a pressure sufficient to subject the pipe to the possibility of a ductile fracture propagating at a high speed in a predetermined direction, and a crack arrestor for arresting such a propagating ductile fracture, wherein the crack arrestor comprises means for stopping the propagating ductile fracture, the stopping means includes a band encompassing and constraining said pipe, and the band includes a plurality of continuous, high tensile strength, non-corrodible, lightweight nonmetallic fibers encapsulated in a resin matrix, the fibers defining with the resin matrix a fluid impervious mass;

said fibers being oriented substantially perpendicular to said predetermined direction of propagation.

33. The combination of a pipe, having an axis, for containing fluid under a pressure sufficient to subject the pipe to the possibility of a ductile fracture propagating at a high speed in a predetermined direction, and a crack arrestor for arresting such a propagating ductile fracture, wherein the crack arrestor comprises means for stopping the propagating ductile fracture, the stopping means includes a band encompassing and constraining said pipe, and the band includes a plurality of continuous, high tensile strength, non-corrodible, lightweight nonmetallic encapsulated in a resin matrix, the fibers comprising at least 67% of the band and defining with the resin matrix a fluid impervious mass.

34. The combination of claim 33, wherein said fibers comprise no more than 75% of the band.

* * * * *